United States Patent
Lu et al.

(10) Patent No.: US 9,495,051 B2
(45) Date of Patent: Nov. 15, 2016

(54) CAPACITIVE TOUCH PANEL

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Youqiang Lu, Beijing (CN); Yun Qiu, Beijing (CN); Jing Wang, Beijing (CN)

(73) Assignees: BOE Technology Group Co., Ltd., Beijing (CN); Chengdu BOE Optoelectronics Technology Co., Ltd., Chengdu (CN)

( * ) Notice: Subject to any disclaimer, the term of this patent is extended or adjusted under 35 U.S.C. 154(b) by 46 days.

(21) Appl. No.: 14/367,757

(22) PCT Filed: Dec. 16, 2013

(86) PCT No.: PCT/CN2013/089600
§ 371 (c)(1),
(2) Date: Jun. 20, 2014

(87) PCT Pub. No.: WO2015/010425
PCT Pub. Date: Jan. 29, 2015

(65) Prior Publication Data
US 2015/0234492 A1 Aug. 20, 2015

(30) Foreign Application Priority Data
Jul. 26, 2013 (CN) .......................... 2013 1 0320943

(51) Int. Cl.
*G06F 3/044* (2006.01)
*G06F 3/041* (2006.01)

(52) U.S. Cl.
CPC ............. *G06F 3/044* (2013.01); *G06F 3/0412* (2013.01); *G06F 2203/04107* (2013.01)

(58) Field of Classification Search
CPC combination set(s) only.
See application file for complete search history.

(56) References Cited

U.S. PATENT DOCUMENTS

| 2011/0221700 | A1* | 9/2011 | Mo | G06F 3/044 345/174 |
| 2012/0206402 | A1* | 8/2012 | Park | G06F 3/044 345/174 |

(Continued)

FOREIGN PATENT DOCUMENTS

| CN | 101882040 A | 11/2010 |
| CN | 102841718 A | 12/2012 |

(Continued)

OTHER PUBLICATIONS

International Search Report for International Application No. PCT/CN2013/089600 issued May 6, 2014, 13pgs.

(Continued)

*Primary Examiner* — Dwayne Bost
*Assistant Examiner* — Robert Michaud
(74) *Attorney, Agent, or Firm* — Banner & Witcoff, Ltd.

(57) ABSTRACT

An embodiment of the present invention discloses a capacitive touch panel, which is provided with an electrostatic protection touching layer, the electrostatic protection touching layer comprises a touching array pattern and an electrostatic protection discharging pattern, and the electrostatic protection discharging pattern is disposed in a space of the touching array pattern, complementing with the touching array pattern. The capacitive touch panel of the embodiment of the present invention, reduces the thickness of touch panel, and saves the material by forming the electrostatic protection layer and the touch sensing layer on one layer, which realizes the touching sense as well as the electrostatic protection, eliminates the capacitance between the electrostatic protection layer and the touch sensing layer, and improves the sensitivity of touching sense.

15 Claims, 2 Drawing Sheets

(56) References Cited

U.S. PATENT DOCUMENTS

2012/0313894 A1    12/2012   Hotelling et al.
2014/0016043 A1*   1/2014   Chen .................. G06F 3/041
                                                        349/12
2015/0301645 A1*   10/2015   Mu .................... G06F 3/044
                                                        345/174

FOREIGN PATENT DOCUMENTS

| CN | 202854765 U | 4/2013 |
| CN | 103186287 A | 7/2013 |
| CN | 103365521 A | 10/2013 |
| EP | 2237135 A2 | 10/2010 |
| WO | 2012128893 A1 | 9/2012 |

OTHER PUBLICATIONS

Oct. 29, 2015—(CN)—First Office Action Appn 201310320943.8 with English Tran.
Jan. 26, 2016—(WO) IPRP & WO App No. PCT/CN2013/089600.

* cited by examiner

CAPACITIVE TOUCH PANEL

CROSS REFERENCE TO RELATED APPLICATIONS

This application is based on International Application No. PCT/CN2013/089600 filed on Dec. 16, 2013, which claims priority to Chinese National Application No. 201310320943.8 filed on Jul. 26, 2013. The entire contents of each and every foregoing application are incorporated herein by reference.

TECHNICAL FIELD

Embodiments of the present invention relate to a capacitive touch panel.

BACKGROUND

In recent years, with the development of the science and technology, liquid crystal display technology continues to improve. TFT-LCDs (Thin Film Transistor-Liquid Crystal Displays) occupy an important position in the field of display because of their good image display quality, low energy consumption, environmental protection and other advantages. In a traditional capacitive touch panel, an electrostatic protection layer and a touch sensing layer are generally provided on the backside of a color filter substrate. The electrostatic protection layer is used to reduce the influence on display quality caused by the static in the outer environment, and the touch sensing layer is used to realize touch sense. However, this design produces large capacitance between the electrostatic protection layer and the touch sensing layer, affecting the sensitivity of the touch sense, and increases the thickness of the touch panel. Therefore, it is needed to provide a capacitive touch panel, which can reduce the thickness of a touch panel as well as realizing touch sense and electrostatic protection, to eliminate the capacitance between the electrostatic protection layer and the touch sensing layer.

SUMMARY

Embodiments of the present invention provide a capacitive touch panel, the capacitive touch panel disposes an electrostatic protection layer on another side of the color filter substrate with black matrix layer forming thereon; the electrostatic protection layer comprises a touch array pattern and a electrostatic protection discharging pattern; the electrostatic protection discharging pattern is disposed in the space of the touch array pattern, complementing with the touch array pattern.

Preferably, for example, the electrostatic protection discharging pattern is insulated from the touch array pattern.

Preferably, for example, the touch array pattern comprises multiple columns of touch units which are disposed side by side at an interval, and the multiple columns of touch units are insulated from each other.

Preferably, for example, the touch unit comprises a charge pattern and a plurality of signal receiving patterns.

Preferably, for example, the charge pattern is a comb shaped pattern, the signal receiving pattern is a U-shaped pattern, the protrusions of the charging pattern insert into the grooves of the signal receiving patterns, one of every two protrusions of the charging pattern inserts into one signal receiving pattern, and the charging pattern and the signal receiving patterns are insulated from each other.

Preferably, for example, the charging pattern and every signal receiving pattern are separately provided with connecting wires.

Preferably, for example, the electrostatic protection touching layer is provided with a bonding region, the wires of the charging pattern and the signal receiving pattern extend to the bonding region.

Preferably, for example, the electrostatic protection touching layer is formed by one patterning process.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms for example "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
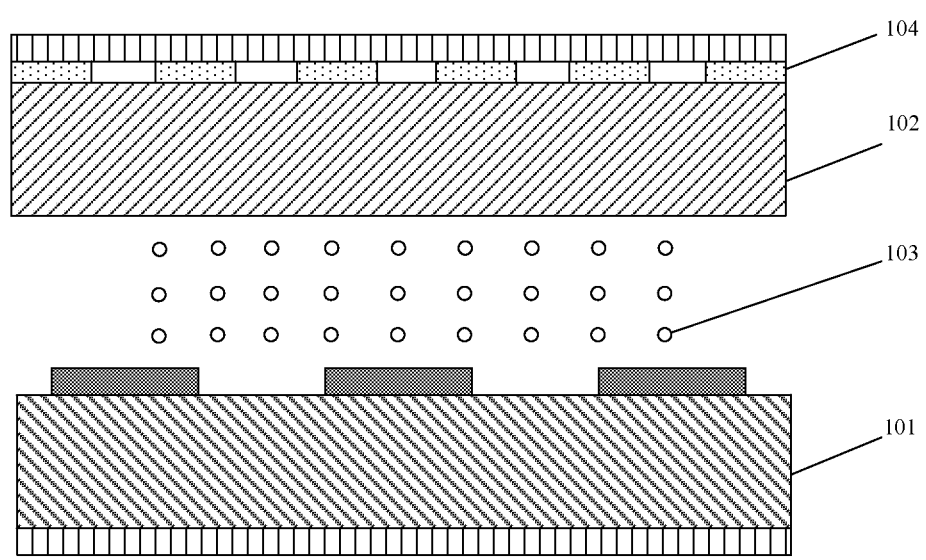
FIG. 1 is an exemplary structural diagram of a capacitive touch panel according to an embodiment of the present invention.

A capacitive touch panel according to an embodiment of the present invention, as illustrated in FIG. 1, is formed of an array substrate 101, a color filter substrate 102, and liquid crystal 103 between the array substrate 101 and the color filter substrate 102. An electrostatic protection touching layer 104 is formed on the backside of the color filter substrate 102, i.e., another side of the color filter substrate with a black matrix being formed thereon. The electrostatic protection touching layer 104 is used to realize the function of electrostatic protection and touching sense, and may be formed of a metal oxide material.

An electrostatic protection touching layer 104 comprises a touching array pattern and an electrostatic protection discharging pattern. The electrostatic protection discharging pattern and the touching array pattern are insulated from each other, i.e. not connected with each other. The electrostatic protection discharging pattern is disposed in the space (interval) of the touching array pattern, complementing with the touching array pattern. The touching array pattern is used to realize a function of touching sense, the touching array pattern and the electrostatic protection discharging pattern which is complementary to the touching array pattern in shape collectively realize a function of electrostatic protection.

In the present embodiment, the electrostatic protection layer is formed along with the touch sensing layer, which not only reduces the thickness of touch panel, saves the material, but also eliminates the capacitance between the electrostatic protection layer and the touch sensing layer in a traditional technology, so as to improve the sensitivity of the touch panel; the electrostatic protection touching layer may be formed by one step of patterning process, so as to reduce the production processes of manufacturing the touch panel, and improve the productive efficiency of the equipments.

Figure 2:
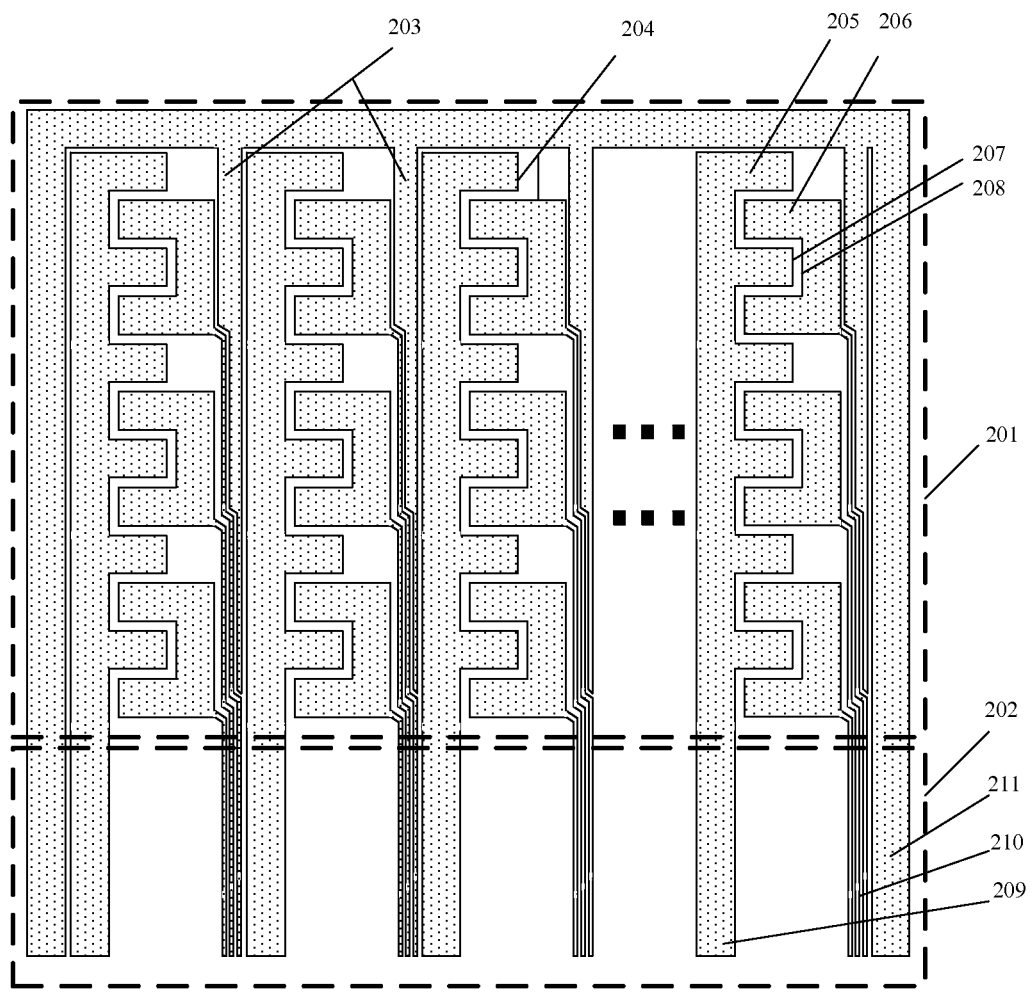
FIG. 2 is an exemplary structurally schematic diagram of an electrostatic protection touching layer according to an embodiment of the present invention.

Specifically, for example, the structure of the electrostatic protection touching layer is illustrated in FIG. 2. The electrostatic protection touching layer is divided into an electrostatic protection touching region 201 and a bonding region 202, formed of a touching array pattern and an electrostatic protection discharging pattern 203. The touching array pattern and the electrostatic protection discharging pattern 203 are insulated from each other, i.e. not connected with each other. The touching array pattern is formed of multiple columns of touching units 204 which are disposed side by side at an interval, the multiple columns of touching units 204 are insulated from each other, and the electrostatic protection discharging pattern 203 is disposed in the space of the multiple touching units 204, complementing with the touching array pattern.

Only four groups of touching array patterns and electrostatic protection discharging patterns are illustrated in FIG. 2. The number and the length of the touching array patterns may be set according to the size of the touch panel.

A touching unit comprises a charge pattern 205 and a plurality of signal receiving patterns 206. The charge pattern 205 may be a comb shaped pattern, the signal receiving pattern 206 may be a U-shaped pattern. The protrusions of the charge pattern 205 insert into the grooves 208 of the signal receiving pattern 206. One of every two protrusions 207 of the charge pattern is inserted into one signal receiving pattern 206. The charge pattern 205 and the signal receiving patterns 206 are insulated from each other, i.e., not connected with each other. The charge pattern 205 is provided with a charge pattern connecting wire 209. Each signal receiving pattern 206 is provided with a signal receiving pattern connecting wire 210. The charge pattern connecting wire 209 of the charge pattern and the signal receiving pattern connecting wire 210 of the signal receiving pattern extend to the bonding region 202.

The touching unit of the touching array pattern provided by the present embodiment is only an example for explanation; one skilled in the art can utilize other touching sensing pattern in the traditional technology to form the touching array, and it only necessary to change the shape of the electrostatic protection discharging pattern, to dispose the electrostatic protection discharge pattern in the interval of the touching array pattern, complementing with the touching array pattern, so that touching sense can be realized and the function of electrostatic protection can be achieved at the same time.

An electrostatic protection discharging pattern 203 is provided with an electrostatic protection discharging pattern connecting wire 211. The electrostatic protection discharging pattern connecting wire 211 may surround the electrostatic protection discharging pattern 203 and the touching array pattern, connect with the electrostatic protection discharging pattern 203, and be insulated from the touching array pattern; the electrostatic protection discharging pattern connecting wire 211 extends to the bonding region 202.

The charge pattern connecting wire 209, the signal receiving pattern connecting wire 21 and the electrostatic protection discharging pattern connecting wire 211 are connected to a circuit board in a bonding area via bonding. Because the electrostatic protection touching layer is made of a transparent metal oxide material, in the process of bonding, it is hard for the equipments to recognize marks, and when forming a black matrix on a color filter substrate, a bonding mark for bonding the electrostatic protection touching layer is formed on the black matrix, so as to achieve the goal of alignment without increasing processes.

The capacitive touch panel of the embodiments of the present invention, reduces the thickness of a touch panel, and saves the material by forming the electrostatic protection layer and the touch sensing layer on one layer, which realizes touching sense as well as electrostatic protection, eliminates the capacitance between the electrostatic protection layer and the touch sensing layer, and improves the sensitivity of touching sense.

The foregoing are merely exemplary embodiments of the invention, but not used to limit the protection scope of the invention. One skilled in the art could devise variations that within the scope and the spirit of the present invention, thus all equal technical solutions also belong to the scope of the present invention, and the protection scope of the invention is defined by attached claims.

The invention claimed is:

1. A capacitive touch panel, comprising:
an electrostatic protection touching layer, disposed on another side of a color filter substrate with a black matrix being formed thereon, wherein the electrostatic protection touching layer comprises a touching array pattern and an electrostatic protection discharging pattern, and the electrostatic protection discharging pattern is disposed in a space of the touching array pattern, complementing with the touching array pattern, the electrostatic protection discharging pattern and the touching array pattern are insulated from each other,
wherein the touching array pattern comprises multiple columns of touching units disposed side by side at an interval, and the multiple touching units are insulated from each other,
wherein each touching unit comprises a charge pattern and a plurality of signal receiving patterns,
wherein the charge pattern and the plurality of signal receiving patterns in each touch unit are located in a same layer, the touching array pattern and the electrostatic protection discharging pattern are located in a same layer.

2. The capacitive touch panel as claimed in claim 1, wherein the charge pattern is a comb shaped pattern, the signal receiving pattern is a U-shaped pattern, protrusions of the charge pattern are inserted into grooves of the signal receiving patterns, one of every two protrusions of the charge pattern is inserted into one signal receiving pattern, and the charge pattern and the signal receiving patterns are insulated from each other.

3. The capacitive touch panel as claimed in claim 2, wherein the charge pattern, each signal receiving pattern and the electrostatic protection discharging pattern are separately provided with connecting wires.

4. The capacitive touch panel as claimed in claim 1, wherein the charge pattern, each signal receiving pattern and the electrostatic protection discharging pattern are separately provided with connecting wires.

5. The capacitive touch panel as claimed in claim 4, wherein the electrostatic protection touching layer is provided with a bonding region, and the connecting wires of the charge pattern and the signal receiving pattern extend to the bonding region.

6. The capacitive touch panel as claimed in claim 1, wherein the electrostatic protection touching layer is formed by one patterning process.

7. The capacitive touch panel as claimed in claim 1, wherein the electrostatic protection touching layer is made of a transparent metal oxide.

8. The capacitive touch panel as claimed in claim 1, wherein the touching array pattern comprises multiple columns of touching units disposed side by side at an interval, and the multiple touching units are insulated from each other.

9. The capacitive touch panel as claimed in claim 8, wherein each touching unit comprises a charge pattern and a plurality of signal receiving patterns.

10. The capacitive touch panel as claimed in claim 9, wherein the charge pattern is a comb shaped pattern, the signal receiving pattern is a U-shaped pattern, protrusions of the charge pattern are inserted into grooves of the signal receiving patterns, one of every two protrusions of the charge pattern is inserted into one signal receiving pattern, and the charge pattern and the signal receiving patterns are insulated from each other.

11. The capacitive touch panel as claimed in claim 10, wherein the charge pattern, each signal receiving pattern and the electrostatic protection discharging pattern are separately provided with connecting wires.

12. The capacitive touch panel as claimed in claim 9, wherein the charge pattern, each signal receiving pattern and the electrostatic protection discharging pattern are separately provided with connecting wires.

13. The capacitive touch panel as claimed in claim 1, wherein the electrostatic protection touching layer is made of a transparent metal oxide.

14. The capacitive touch panel as claimed in claim 1, wherein the electrostatic protection touching layer is made of a transparent metal oxide.

15. A display device comprising a capacitive touch panel comprising:
   an electrostatic protection touching layer, disposed on another side of a color filter substrate with a black matrix being formed thereon, wherein the electrostatic protection touching layer comprises a touching array pattern and an electrostatic protection discharging pattern, and the electrostatic protection discharging pattern is disposed in a space of the touching array pattern, complementing with the touching array pattern, the electrostatic protection discharging pattern and the touching array pattern are insulated from each other,
   wherein the touching array pattern comprises multiple columns of touching units disposed side by side at an interval, and the multiple touching units are insulated from each other,
   wherein each touching unit comprises a charge pattern and a plurality of signal receiving patterns,
   wherein the charge pattern and the plurality of signal receiving patterns in each touch unit are located in a same layer, the touching array pattern and the electrostatic protection discharging pattern are located in a same layer.

\* \* \* \* \*